United States Patent
Katz et al.

(10) Patent No.: US 12,302,014 B2
(45) Date of Patent: *May 13, 2025

(54) HIGH DYNAMIC RANGE FOR DUAL PIXEL SENSORS

(71) Applicant: Snap Inc., Santa Monica, CA (US)

(72) Inventors: Sagi Katz, Yokneam Ilit (IL); Netanel Kligler, Tzippori (IL); Gilad Refael, Ashdod (IL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,082

(22) Filed: May 7, 2024

(65) Prior Publication Data
US 2024/0292122 A1    Aug. 29, 2024

Related U.S. Application Data

(63) Continuation of application No. 18/199,659, filed on May 19, 2023, now Pat. No. 12,015,859, which is a continuation of application No. 17/653,751, filed on Mar. 7, 2022, now Pat. No. 11,671,718.

(51) Int. Cl.
   *H04N 25/57*  (2023.01)
(52) U.S. Cl.
   CPC .................. *H04N 25/57* (2023.01)
(58) Field of Classification Search
   CPC ..... H04N 25/57; H04N 25/585; H04N 25/704
   USPC ....................................................... 348/294
   See application file for complete search history.

(56) References Cited

U.S. PATENT DOCUMENTS

| 11,671,718 B1 | 6/2023 | Katz et al. |
| 2011/0052053 A1* | 3/2011 | Tomaselli ............. H04N 9/77 382/167 |
| 2011/0205406 A1 | 8/2011 | Gough |
| 2015/0237281 A1 | 8/2015 | Deguchi et al. |
| 2019/0035064 A1 | 1/2019 | Franklin |
| 2020/0268234 A1 | 8/2020 | Nakagawa et al. |

(Continued)

FOREIGN PATENT DOCUMENTS

| CN | 118830255 A | 10/2024 |
| WO | WO-2023172894 A1 | 9/2023 |

OTHER PUBLICATIONS

"U.S. Appl. No. 17/653,751, Notice of Allowance mailed Jan. 27, 2023".

(Continued)

*Primary Examiner* — Lin Ye
*Assistant Examiner* — Chan T Nguyen
(74) *Attorney, Agent, or Firm* — Schwegman Lundberg & Woessner, P.A.

(57) ABSTRACT

A method for increasing a dynamic range of a dual-pixel image sensor is described. The method includes detecting an intensity level of a full pixel from a plurality of pixels of an optical sensor, one or more full pixels of the plurality of pixels includes at least two sub-pixels, detecting an intensity level of one or more sub-pixels, detecting that the intensity level of the full pixel of the optical sensor has reached a saturation level of the full pixel, and in response to detecting that the intensity level of the full pixel of the optical sensor has reached the saturation level of the full pixel, computing an extrapolated intensity level of the full pixel based on the intensity level of the one or more sub-pixels.

20 Claims, 12 Drawing Sheets

(56) References Cited

U.S. PATENT DOCUMENTS

2021/0151486 A1* 5/2021 Kobayashi ............ H04N 25/76
2022/0013571 A1  1/2022 Cao et al.
2023/0292019 A1  9/2023 Katz et al.

OTHER PUBLICATIONS

"U.S. Appl. No. 18/199,659, Non Final Office Action mailed Jan. 3, 2024", 15 pgs.

"U.S. Appl. No. 18/199,659, Notice of Allowance mailed Feb. 14, 2024", 9 pgs.

"U.S. Appl. No. 18/199,659, Response filed Jan. 30, 2024 to Non Final Office Action mailed Jan. 3, 2024", 7 pgs.

U.S. Appl. No. 17/653,751 U.S. Pat. No. 11,671,718, filed Mar. 7, 2022, High Dynamic Range for Dual Pixel Sensors.

U.S. Appl. No. 18/199,659, filed May 19, 2023, High Dynamic Range for Dual Pixel Sensors.

"International Application Serial No. PCT/US2023/063833, International Preliminary Report on Patentability mailed Sep. 19, 2024", 5 pgs.

"International Application Serial No. PCT/US2023/063833, International Search Report mailed Jun. 28, 2023", 3 pgs.

"International Application Serial No. PCT/US2023/063833, Written Opinion mailed Jun. 28, 2023", 3 pgs.

* cited by examiner

- *FullPixelSaturation* - constant per sensor

- Compute *R(x,y)*
  - R(x,y) - left to full ratio. Pixel-wise linear ratio between the sub-pixel's intensity (left, in our case) to that of the full pixel

- Compute *L(x,y)*
  - L(x,y) - left value at full pixel saturation. Pixel-wise expected value of the sub-pixel (left, in our case) when the full pixel saturates.

602 — *L(x,y) = FullPixelSaturation\*R(x, y)*

FIG. 6

- For every full pixel:
  - If pixel is saturated and $L(x,y) < I_{left}(x,y)$ :

704  $I_{increased}(x,y) = fullPixelSaturation + \dfrac{I_{left}(x,y) - L(x,y)}{R(x,y)}$

- Otherwise:

706  $I_{increased}(x,y) = I_{full}(x,y)$

FIG. 7

HIGH DYNAMIC RANGE FOR DUAL PIXEL SENSORS

CLAIM OF PRIORITY

This application is a continuation of U.S. patent application Ser. No. 18/199,659, filed May 19, 2023, which is a continuation of U.S. patent application Ser. No. 17/653,751, filed Mar. 7, 2022, which is incorporated herein by reference in its entirety.

TECHNICAL FIELD

The subject matter disclosed herein generally relates to an imaging sensor. Specifically, the present disclosure addresses systems and methods for high dynamic range with dual pixels phase detection sensors.

BACKGROUND

Image sensors are commonly used in digital still cameras, mobile phones, security cameras. The technology used to manufacture image sensors, such as, for example complementary metal-oxide-semiconductor (CMOS) image sensors (CIS), has continued to advance at a great pace. For example, the demands for higher resolution and lower power consumption have encouraged the further miniaturization and integration of these image sensors.

Generally defined, dynamic range is the ratio between the largest and smallest possible values of a changeable quantity, such as in signals like sound and light. In digital image and video processing, conventionally, digital images (e.g., video or still images) are captured, rendered, and displayed at a limited dynamic range, referred to as standard dynamic range (SDR) imaging. In addition, images are conventionally rendered for display using a relatively narrow color gamut, referred to as standard color gamut (SCG) imaging. Extended or high dynamic range (HDR) imaging refers to technology and techniques that produce a wider range of luminance in electronic images (e.g., as displayed on display screens or devices) than is obtained using standard digital imaging technology and techniques (referred to as standard dynamic range, or SDR, imaging). Many new devices such as image sensors and displays support HDR imaging as well as wide color gamut (WCG) imaging. These devices may be referred to as HDR-enabled devices or simply HDR devices.

Although CMOS image sensors have improved significantly in the last decade in their ability to observe details in the dark (lowlight) areas of the scene (mainly by reducing the electronic read out noise, for example, with the use of pinned diode-type photodiodes with CDS), the dynamic range of CMOS image sensors still remains well below that of the human eye in their ability to capture all details in an uncontrolled lighting environment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 illustrates an example calibration algorithm in accordance with one example embodiment.

FIG. 7 illustrates an example runtime algorithm in accordance with one example embodiment.

DETAILED DESCRIPTION

Figure 1:
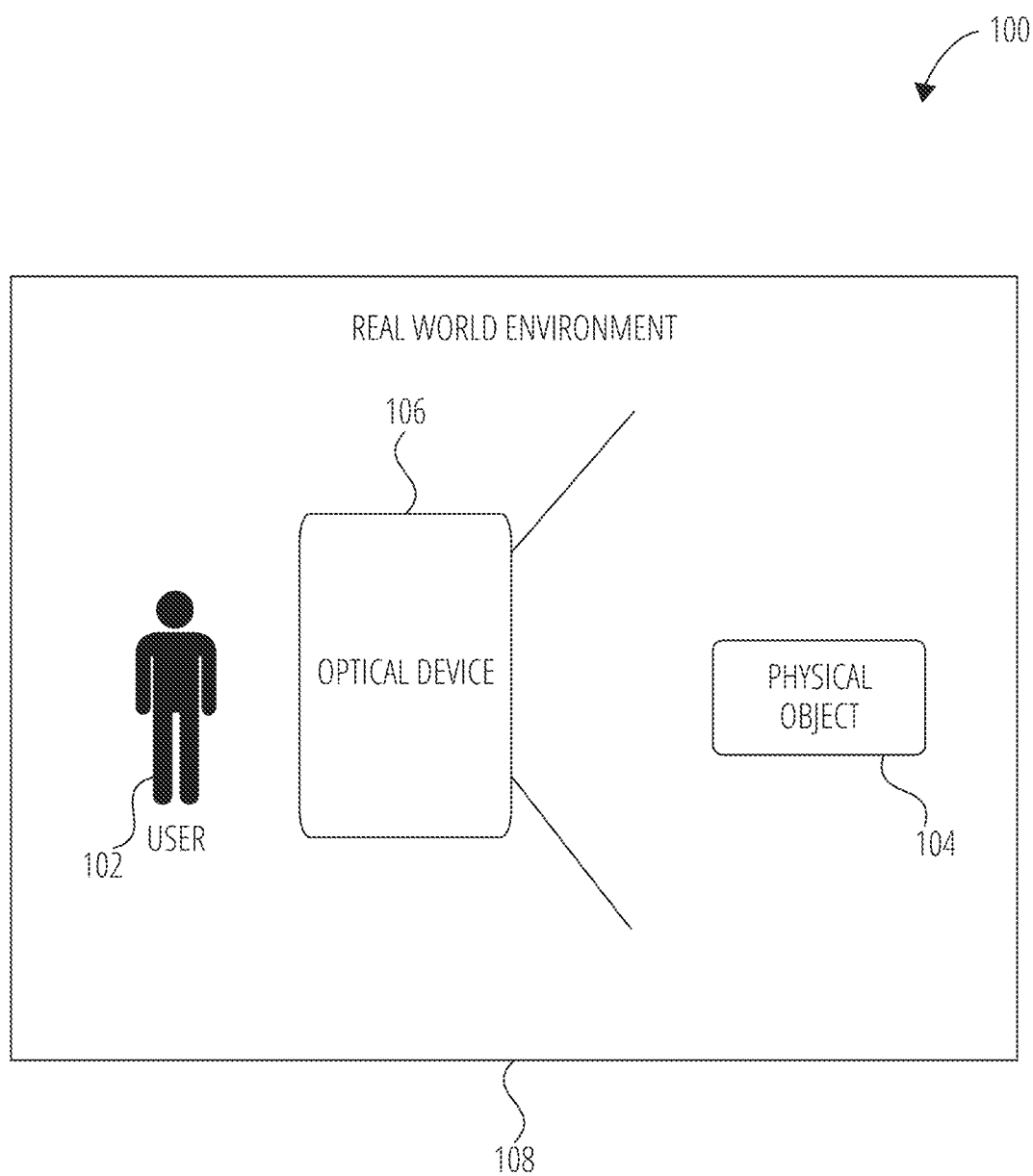
FIG. 1 is a block diagram illustrating an environment for operating an optical device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Camera systems require autofocus (AF) in many applications so that relevant portions of scenes, of varying distances from the camera, are acquired as in-focus image planes. Focus is achieved at an optimum distance of the image sensor from the lens. The goal of an auto-focus system in a camera is to predict this optimum distance based on image information, and utilize on-board mechanics to achieve the optimum distance.

The term "pixel" in the present application refers to a pixel sensor unit cell of an image sensor. Image sensors have been developed that enable the acquisition of information with reference to the extent of focus of an image using dual pixel AF. Certain implementations of dual pixel AF employ phase-detection. A region the size of a standard pixel in an image sensor array is divided into two sub-pixels. A phase-difference autofocus component of the image sensor compares the outputs of the divided sub-pixels. The phase-difference autofocus estimates whether the image is in focus, and provides information to a feedback system (motorized lens system) to enable rapid convergence to a focused image.

The present application describes a method for exploiting the sensor specific properties and characteristics of sub-pixels and full pixels. In one example, the method computes calibration data based on the relationship between the sub-pixels values and the full pixel values. The method can then apply the relationship to values from the sub-pixels to extrapolate an expected full pixel value in situations where the full pixel is already saturated. Such an extrapolation can serve to "virtually" increase the dynamic range of the RGB image (which is based on the full pixel values).

In one example embodiment, a method for increasing a dynamic range of a dual-pixel image sensor is described. The method includes detecting an intensity level of a full pixel from a plurality of pixels of an optical sensor, one or more full pixels of the plurality of pixels includes at least two sub-pixels, detecting an intensity level of one or more sub-pixels, detecting that the intensity level of the full pixel of the optical sensor has reached a saturation level of the full pixel, and in response to detecting that the intensity level of the full pixel of the optical sensor has reached the saturation level of the full pixel, computing an extrapolated intensity level of the full pixel based on the intensity level of the one or more sub-pixels.

As a result, one or more of the methodologies described herein facilitate solving the technical problem of saturated image sensors. The presently described method provides an improvement to an operation of the functioning of an optical device by calibrating the optical device based on the sensor properties (e.g., relationship the sub-pixels and the full pixel) and extrapolating the value of the full pixel where the full pixel is saturated.

FIG. 1 is a network diagram illustrating an environment 100 suitable for operating an optical device 106, according to some example embodiments. The environment 100 includes a user 102, an optical device 106, and a physical object 104. A user 102 operates the optical device 106. The user 102 may be a human user (e.g., a human being), a machine user (e.g., a computer configured by a software program to interact with the optical device 106), or any suitable combination thereof (e.g., a human assisted by a machine or a machine supervised by a human). The user 102 is associated with the optical device 106.

The optical device 106 includes a computing device. In one example, the computing device includes a digital camera, a smartphone, a tablet computer, or a wearable computing device (e.g., watch or glasses). The computing device may be hand-held or may be removable mounted to a head of the user 102. In one example, the optical device 106 includes a display that displays images captured with a camera of the optical device 106.

In another example, the display may be transparent such as in lenses of wearable computing glasses. In other examples, the display may be non-transparent, partially transparent, or partially opaque. In yet other examples, the display may be wearable by the user 102 to cover the field of vision of the user 102.

In another example, the optical device 106 includes an optical application (e.g., AR/VR application) that generates virtual content based on images detected with the camera of the optical device 106. For example, the user 102 may point a camera of the optical device 106 to capture an image of the physical object 104. The optical application detects an image of the physical object 104, generates virtual content corresponding to the physical object 104, and presents the virtual content in a display of the optical device 106.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 4 and FIG. 5. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The optical device 106 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
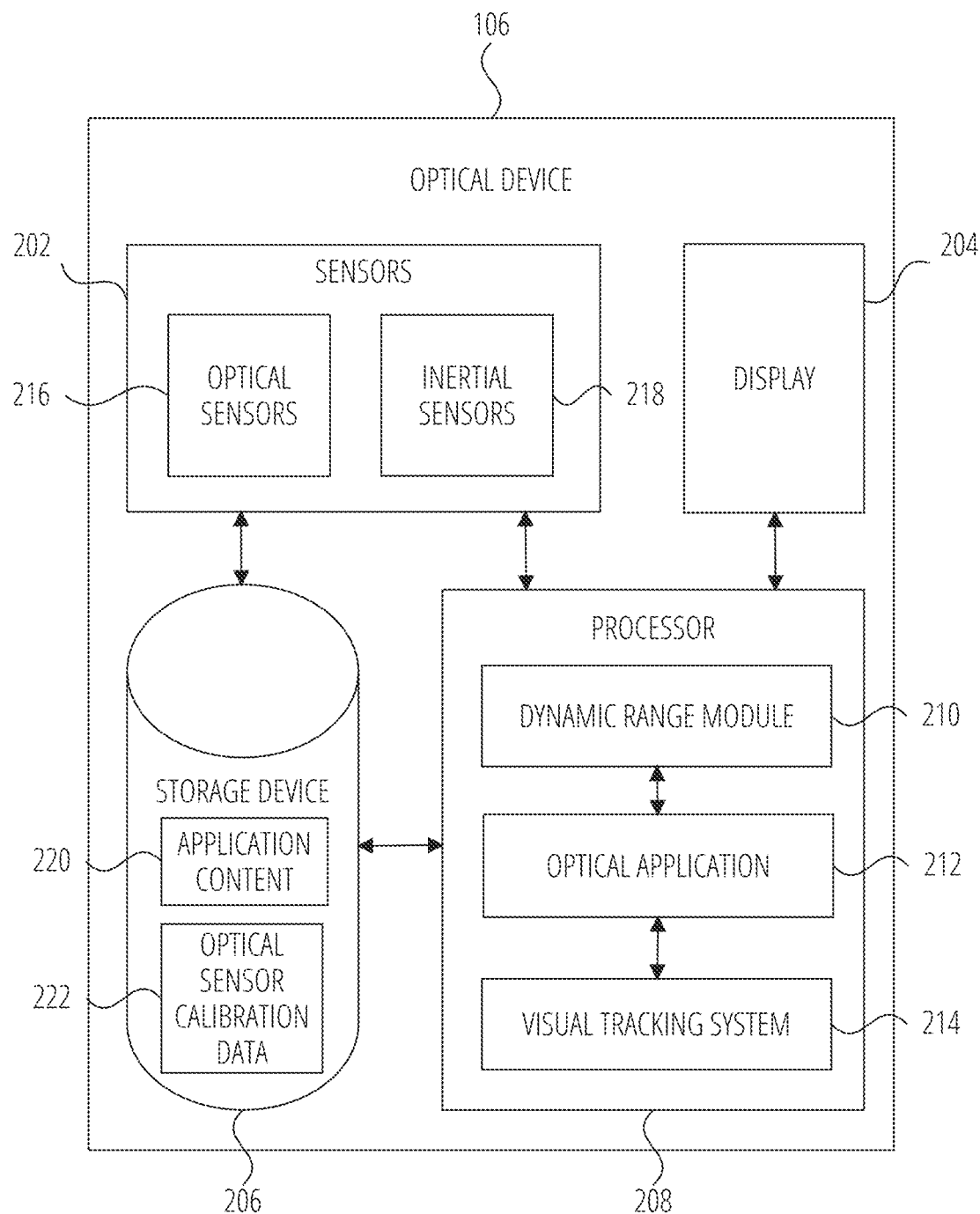
FIG. 2 is a block diagram illustrating an optical device in accordance with one example embodiment.

FIG. 2 is a block diagram illustrating modules (e.g., components) of the optical device 106, according to some example embodiments. The optical device 106 includes sensors 202, a display 204, a processor 208, and a storage device 206. Examples of optical device 106 include a digital camera, a wearable computing device, a desktop computer, a vehicle computer, a tablet computer, a navigational device, a portable media device, or a smart phone.

The sensors 202 include, for example, optical sensors 216 (e.g., dual pixels phase detection sensors) and inertial sensors 218 (e.g., gyroscope, accelerometer). The size of a standard pixel (also referred to full pixel) in the image sensor array of the optical sensors 216 is divided into two or more sub-pixels. For example, in dual pixel phase detection sensors, each pixel in the optical sensors 216 comprises two sub-pixels (e.g., a left sub-pixel and a right sub-pixel). In another example, the optical sensors 216 include a combination of one or more full pixels and two or more sub-pixels.

Other examples of sensors 202 include thermal cameras, depth sensors, global shutter tracking cameras, a proximity or location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-opaque so that the user 102 can see through the display 204 (in AR use case). In another example embodiment, the display 204 covers the eyes of the user 102 and blocks out the entire field of view of the user 102 (in VR use case). In another example, the display 204 includes a touchscreen display configured to receive a user input via a contact on the touchscreen display.

The processor 208 includes a dynamic range module 210, an optical application 212, a visual tracking system 214. The dynamic range module 210 retrieves optical sensor calibration data 222 from the storage device 206. The optical sensor calibration data 222 retrieves a (linear or non-linear) relationship between a sub-pixel and a full pixel based on the characteristics and properties of the dual pixels PD sensors. During runtime, the dynamic range module 210 detects that a full pixel is saturated; for example, during an optical integration period, electrons are created in a pixel well at a rate proportional to the light intensity reaching the sensing area. As the electrons are collected in the photodetector, the pixel well begins to fill. If the photodetector charge well becomes full of charge, it becomes saturated. In another example, the photodetector charge may become "saturated" based on a preset limit defined by a manufacturer of the photodetector. Once the dynamic range module 210 detects that a full pixel has reached saturation, the dynamic range module 210 detects the value from a sub-pixel of the full pixel and applies the relationship to the value to extrapolate a virtual value for the full pixel. The method is described in more detail below with respect to FIG. 3.

The optical application 212 detects and identifies a physical environment or the physical object 104 using computer vision. For example, the optical application 212 retrieves a virtual object (e.g., 3D object model) based on the identified physical object 104 or physical environment. The optical application 212 renders the virtual object in the display 204. For an AR application, the optical application 212 includes a local rendering engine that generates a visualization of a virtual object overlaid (e.g., superimposed upon, or otherwise displayed in tandem with) on an image of the physical object 104 captured by the optical sensors 216. A visualization of the virtual object may be manipulated by adjusting a position of the physical object 104 (e.g., its physical location, orientation, or both) relative to the optical sensors 216. Similarly, the visualization of the virtual object may be manipulated by adjusting a pose of the optical device 106 relative to the physical object 104. For a VR application, the optical application 212 displays the virtual object in the display 204 at a location (in the display 204) determined based on a pose of the optical device 106.

The visual tracking system 214 estimates a pose of the optical device 106. For example, the visual tracking system 214 uses image data and corresponding inertial data from the optical sensors 216 and the inertial sensors 218 to track a location and pose of the optical device 106 relative to a frame of reference (e.g., real world environment 108) using an inertial measurement unit (IMU). The visual tracking system 214 tracks the pose (e.g., position and orientation) of the optical device 106 relative to the real world environment 108 using, for example, optical sensors (e.g., depth-enabled 3D camera, image camera), inertia sensors (e.g., gyroscope, accelerometer), wireless sensors (Bluetooth, Wi-Fi), GPS sensor, and audio sensor.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

The storage device 206 stores application content 220 and optical sensor calibration data 222. The optical sensor calibration data 222 include calibration data based on the characteristics of the dual pixel PD sensors. In one example, the optical sensor calibration data 222 may be determined by the dynamic range module 210. In another example, the optical sensor calibration data 222 is uploaded to the storage device 206 at a factory environment of the optical device 106.

The application content 220 includes, for example, a database of visual references (e.g., images) and corresponding experiences (e.g., three-dimensional virtual objects, interactive features of the three-dimensional virtual objects).

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. VIO (also referred to as a visual-inertial tracking system) determines a latest pose (e.g., position and orientation) of a device based on data acquired from multiple sensors (e.g., optical sensors, inertial sensors) of the device.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
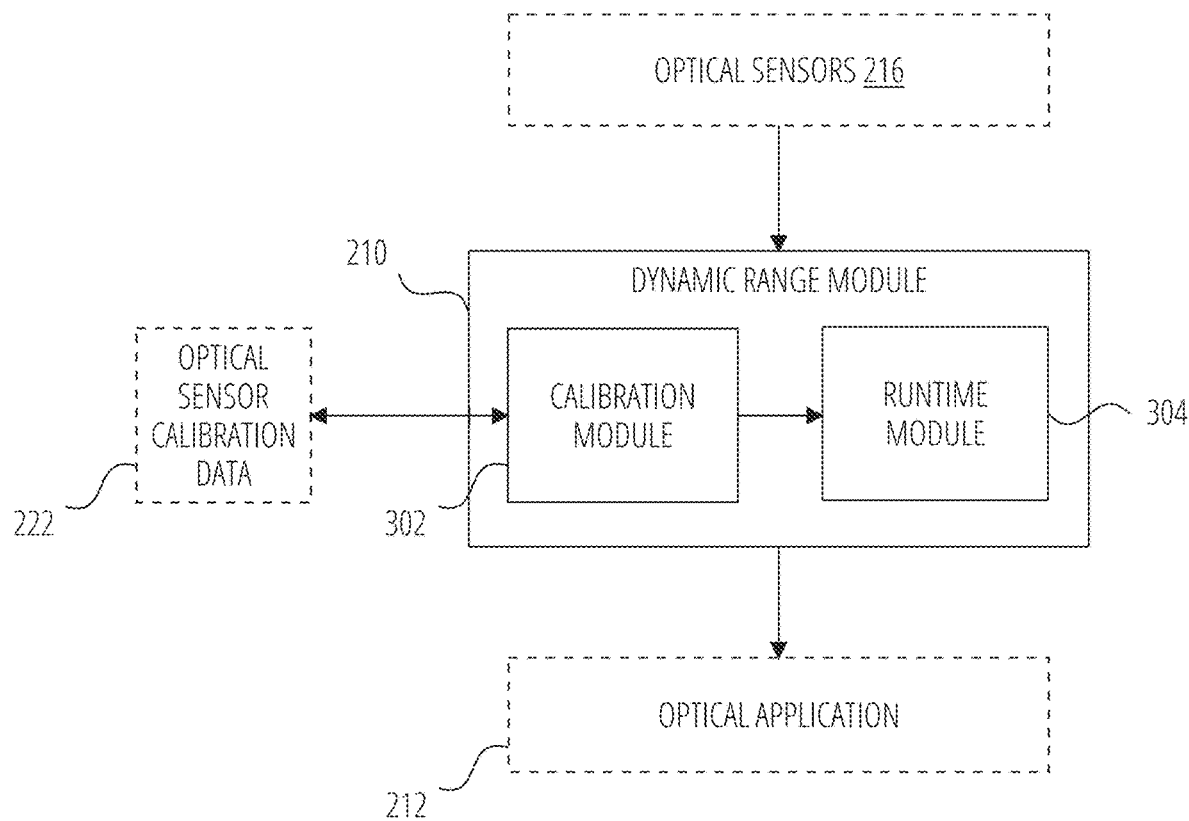
FIG. 3 is a block diagram illustrating a dynamic range module in accordance with one example embodiment.

FIG. 3 is a block diagram illustrating a dynamic range module 210 in accordance with one example embodiment. The dynamic range module 210 includes a calibration module 302 and a runtime module 304.

The calibration module 302 accesses optical sensor calibration data 222 from the storage device 206. The optical sensor calibration data 222 identifies a relationship between a sub-pixel and a full pixel of the optical sensors 216 (e.g., dual pixels PD sensors). In one example, the relationship indicates a linear relationship (e.g., constant ratio) between the sub-pixel and the full pixel of the optical sensors 216 (e.g., dual pixels PD sensors). This relationship may be identified during a factory setting of the optical device 106. In another example, the calibration module 302 performs the calibration process by determining the relationship between a sub-pixel and a full pixel based on sampled values from the optical sensors 216.

In one example embodiment, the calibration module 302 identifies a full pixel saturation value (which constant for each full pixel sensor). For a full pixel of the optical sensors 216, the calibration module 302 computes a ratio between an intensity of a sub-pixel (e.g., right or left sub-pixel) to the intensity of the full pixel (prior to the full pixel being saturated). The calibration module 302 can then determine the pixel-wise expected value of the sub-pixel based on the ratio (when the full pixel is saturated).

The runtime module 304 accesses values from the full pixel and values from the sub-pixels from optical sensors 216 and applies the calibration data to the values to determine an extrapolated intensity of a full pixel. In one example, for every full pixel, the runtime module 304 calculates an extrapolated or projected value of the full pixel based on the saturation level of the full pixel, the value of the sub-pixel, and the ratio between the sub-pixel and the full pixel. The values of non-saturated pixels and extrapolated values (e.g., virtual intensity) of full pixels (where the full pixels are saturated) are provided to the optical application 212 for further processing.

Figure 4:
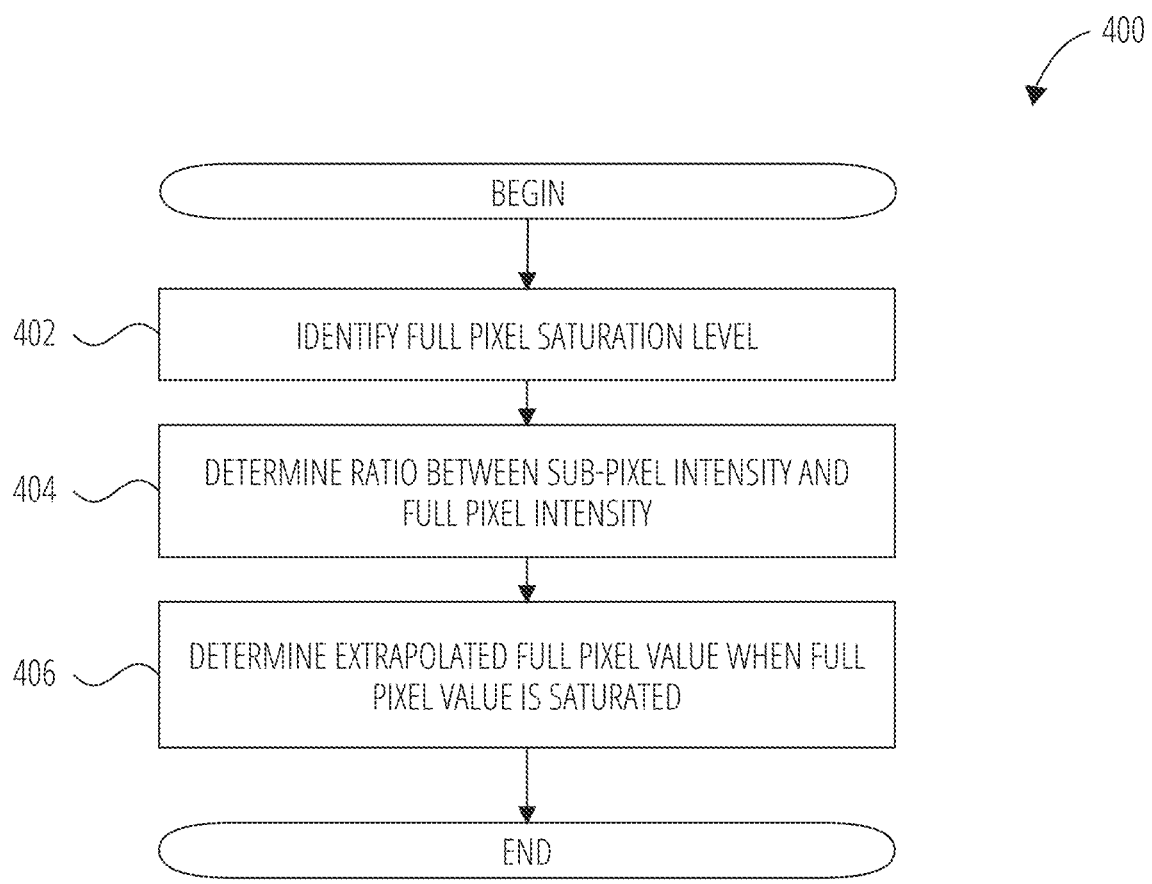
FIG. 4 is a flow diagram illustrating a method for determining an extrapolated sub-pixel value in accordance with one example embodiment.

FIG. 4 is a flow diagram illustrating a method 400 for determining an extrapolated sub-pixel value when the full pixel is saturated in accordance with one example embodiment. Operations in the method 400 may be performed by the dynamic range module 210, using components (e.g., modules, engines) described above with respect to FIG. 3. Accordingly, the method 400 is described by way of example with reference to the calibration module 302. However, it shall be appreciated that at least some of the operations of the method 400 may be deployed on various other hardware configurations or be performed by similar components residing elsewhere.

In block 402, the calibration module 302 identifies a full pixel saturation level for a full pixel. In block 404, the calibration module 302 determines a ratio between a sub-pixel intensity and a full pixel intensity for the full pixel. In block 406, the calibration module 302 determines an extrapolated full pixel value (based on the sub-pixel intensity value) when the full pixel value is saturated.

Figure 5:
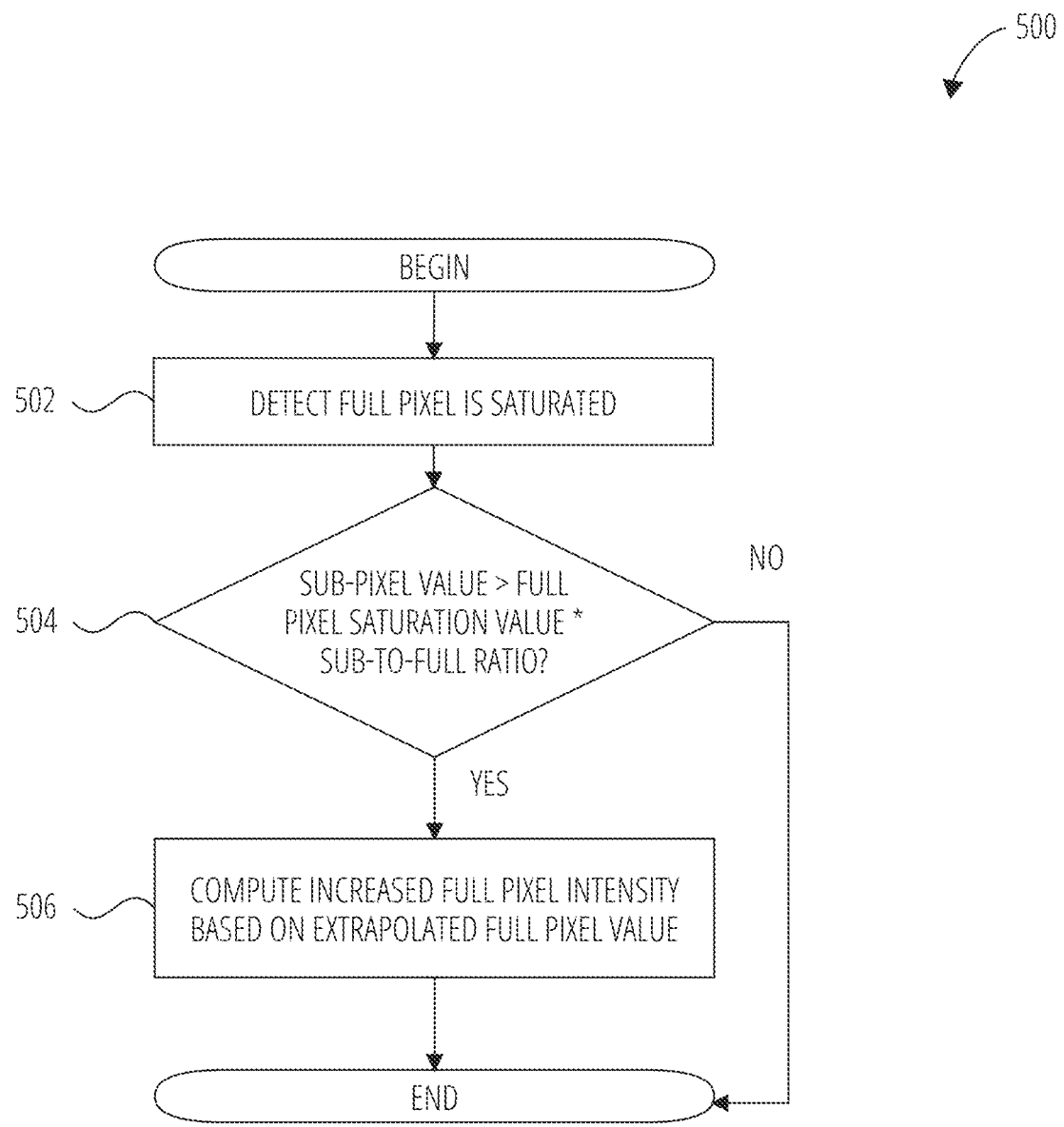
FIG. 5 is a flow diagram illustrating a method for computing an increased full pixel intensity value in accordance with one example embodiment.

FIG. 5 is a flow diagram illustrating a method 500 for computing a projected value of a full pixel in accordance with one example embodiment. Operations in the method 500 may be performed by the dynamic range module 210, using components (e.g., modules, engines) described above with respect to FIG. 3. Accordingly, the method 500 is described by way of example with reference to the runtime module 304. However, it shall be appreciated that at least some of the operations of the method 500 may be deployed on various other hardware configurations or be performed by similar components residing elsewhere.

In block 502, the runtime module 304 detects that a full pixel is saturated. In decision block 504, the runtime module 304 determines whether the sub-pixel value is greater than the product of the full pixel saturation value and the sub-to-full ratio. In block 506, the runtime module 304 computes the increased full pixel intensity based on the extrapolated full pixel value.

FIG. 6 illustrates an example calibration algorithm 602 in accordance with one example embodiment. The calibration module 302 operates the calibration algorithm 602. R(x,y) represents the sub-pixel to full pixel ratio. L(x,y) represents the value of the sub-pixel at full pixel saturation.

Dual pixel DP sensors usually have a linear relationship between sub-pixel and full pixel intensities. Even if the relationship is not linear, the presently described method is still applicable by modeling the relationship.

FIG. 7 illustrates an example runtime algorithm 702 in accordance with one example embodiment. The runtime module 304 operates the runtime algorithm 702 for every full pixel. If a full pixel is saturated and the sub-pixel is not saturated, the projected or extrapolated value of the full pixel can be computed using equation 704.

Figure 8:
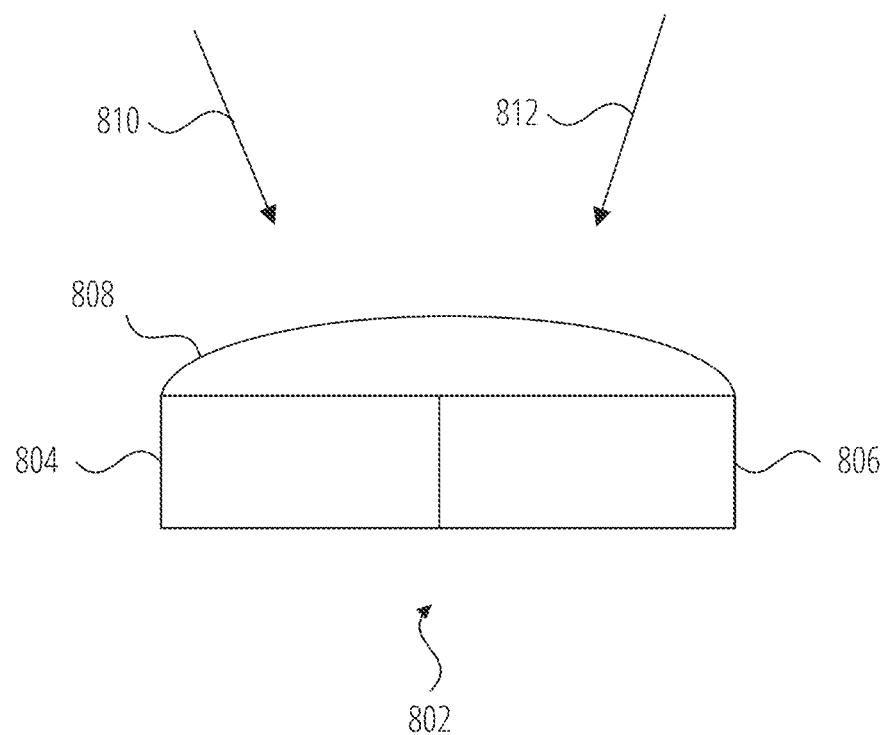
FIG. 8 illustrates an example of dual pixel image sensor in accordance with one example embodiment.

FIG. 8 illustrates an example of a dual pixels PD sensor 802 in accordance with one example embodiment. The dual pixels PD sensor 802 includes a microlens 808 and two sub-pixels (e.g., left photodiode 804, right photodiode 806). The left photodiode 804 receives phase information 810. The right photodiode 806 receives phase information 812.

In the case of an out-of-focus image, the phase information from the scene is mapped differently (with a different phase) onto the "left-pixel" sub-image and the "right-pixel" sub-image. This difference is used as a basis for determining the change in lens-to-imager-distance required. In-focus is achieved in the region of interest when the image based on the "left-pixel" sub-image and the "right-pixel" sub-image are at the highest correlation possible (are in phase). This implies that, when in focus, spatial frequency information in the image mapped to the "left-pixel" and "right-pixel" sub-images is synced in phase and amplitude, yielding a maximum correlation.

Figure 9:
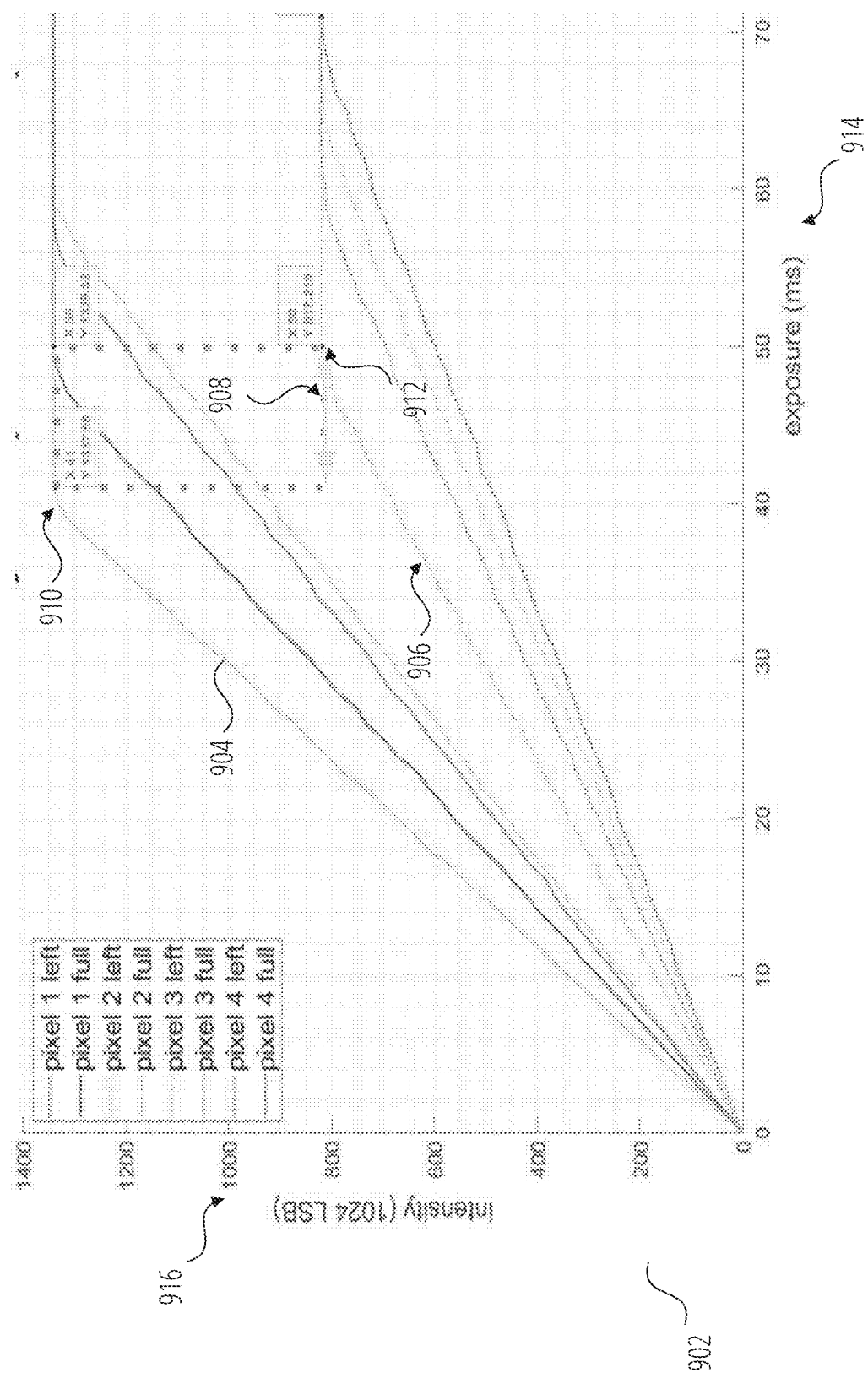
FIG. 9 illustrates a graph in accordance with one example embodiment.

FIG. 9 illustrates a graph 902 in accordance with one example embodiment. The vertical axis 916 indicates an intensity value. The horizontal axis 914 indicates an exposure value. The graph 902 illustrates the relationship between the intensity value and the exposure value for a full pixel and a sub-pixel. For example, the curve 904 represents the intensity value/exposure relationship for a full pixel. The curve 906 represents intensity value/exposure relationship for a corresponding sub-pixel. As illustrated, the full pixel is saturated at saturation level 910. After the full-pixel is saturated, the sub-pixel still absorb photons (represented by range 908) until the sub-pixel reaches its own saturation level 912.

System with Head-Wearable Apparatus

Figure 10:
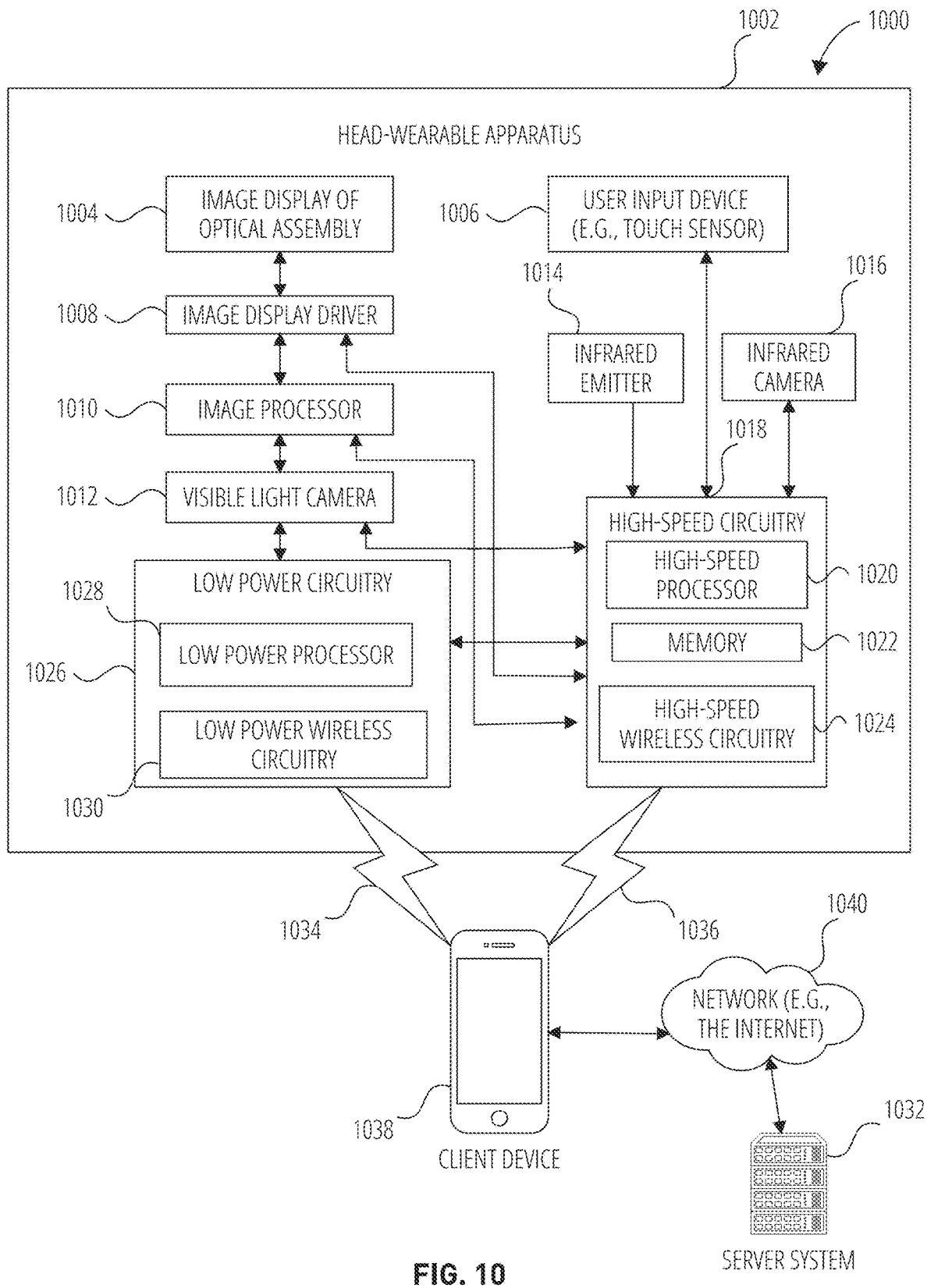
FIG. 10 illustrates a network environment in which a head-wearable device can be implemented according to one example embodiment.

FIG. 10 illustrates a network environment 1000 in which the head-wearable apparatus 1002 can be implemented according to one example embodiment. FIG. 10 is a high-level functional block diagram of an example head-wearable apparatus 1002 communicatively coupled a mobile client device 1038 and a server system 1032 via various network 1040.

head-wearable apparatus 1002 includes a camera, such as at least one of visible light camera 1012, infrared emitter 1014 and infrared camera 1016. The client device 1038 can be capable of connecting with head-wearable apparatus 1002 using both a communication 1034 and a communication 1036. client device 1038 is connected to server system 1032 and network 1040. The network 1040 may include any combination of wired and wireless connections.

The head-wearable apparatus 1002 further includes two image displays of the image display of optical assembly

1004. The two include one associated with the left lateral side and one associated with the right lateral side of the head-wearable apparatus 1002. The head-wearable apparatus 1002 also includes image display driver 1008, image processor 1010, low-power low power circuitry 1026, and high-speed circuitry 1018. The image display of optical assembly 1004 are for presenting images and videos, including an image that can include a graphical user interface to a user of the head-wearable apparatus 1002.

The image display driver 1008 commands and controls the image display of the image display of optical assembly 1004. The image display driver 1008 may deliver image data directly to the image display of the image display of optical assembly 1004 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1002 includes a frame and stems (or temples) extending from a lateral side of the frame. The head-wearable apparatus 1002 further includes a user input device 1006 (e.g., touch sensor or push button) including an input surface on the head-wearable apparatus 1002. The user input device 1006 (e.g., touch sensor or push button) is to receive from the user an input selection to manipulate the graphical user interface of the presented image.

The components shown in FIG. 10 for the head-wearable apparatus 1002 are located on one or more circuit boards, for example a PCB or flexible PCB, in the rims or temples. Alternatively, or additionally, the depicted components can be located in the chunks, frames, hinges, or bridge of the head-wearable apparatus 1002. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1002 includes a memory 1022 which stores instructions to perform a subset or all of the functions described herein. memory 1022 can also include storage device.

As shown in FIG. 10, high-speed circuitry 1018 includes high-speed processor 1020, memory 1022, and high-speed wireless circuitry 1024. In the example, the image display driver 1008 is coupled to the high-speed circuitry 1018 and operated by the high-speed processor 1020 in order to drive the left and right image displays of the image display of optical assembly 1004. high-speed processor 1020 may be any processor capable of managing high-speed communications and operation of any general computing system needed for head-wearable apparatus 1002. The high-speed processor 1020 includes processing resources needed for managing high-speed data transfers on communication 1036 to a wireless local area network (WLAN) using high-speed wireless circuitry 1024. In certain examples, the high-speed processor 1020 executes an operating system such as a LINUX operating system or other such operating system of the head-wearable apparatus 1002 and the operating system is stored in memory 1022 for execution. In addition to any other responsibilities, the high-speed processor 1020 executing a software architecture for the head-wearable apparatus 1002 is used to manage data transfers with high-speed wireless circuitry 1024. In certain examples, high-speed wireless circuitry 1024 is configured to implement Institute of Electrical and Electronic Engineers (IEEE) 802.11 communication standards, also referred to herein as Wi-Fi. In other examples, other high-speed communications standards may be implemented by high-speed wireless circuitry 1024.

The low power wireless circuitry 1030 and the high-speed wireless circuitry 1024 of the head-wearable apparatus 1002 can include short range transceivers (Bluetooth™) and wireless wide, local, or wide area network transceivers (e.g., cellular or WiFi). The client device 1038, including the transceivers communicating via the communication 1034 and communication 1036, may be implemented using details of the architecture of the head-wearable apparatus 1002, as can other elements of network 1040.

The memory 1022 includes any storage device capable of storing various data and applications, including, among other things, camera data generated by the left and right, infrared camera 1016, and the image processor 1010, as well as images generated for display by the image display driver 1008 on the image displays of the image display of optical assembly 1004. While memory 1022 is shown as integrated with high-speed circuitry 1018, in other examples, memory 1022 may be an independent standalone element of the head-wearable apparatus 1002. In certain such examples, electrical routing lines may provide a connection through a chip that includes the high-speed processor 1020 from the image processor 1010 or low power processor 1028 to the memory 1022. In other examples, the high-speed processor 1020 may manage addressing of memory 1022 such that the low power processor 1028 will boot the high-speed processor 1020 any time that a read or write operation involving memory 1022 is needed.

As shown in FIG. 10, the low power processor 1028 or high-speed processor 1020 of the head-wearable apparatus 1002 can be coupled to the camera (visible light camera 1012; infrared emitter 1014, or infrared camera 1016), the image display driver 1008, the user input device 1006 (e.g., touch sensor or push button), and the memory 1022.

The head-wearable apparatus 1002 is connected with a host computer. For example, the head-wearable apparatus 1002 is paired with the client device 1038 via the communication 1036 or connected to the server system 1032 via the network 1040. server system 1032 may be one or more computing devices as part of a service or network computing system, for example, that include a processor, a memory, and network communication interface to communicate over the network 1040 with the client device 1038 and head-wearable apparatus 1002.

The client device 1038 includes a processor and a network communication interface coupled to the processor. The network communication interface allows for communication over the network 1040, communication 1034 or communication 1036. client device 1038 can further store at least portions of the instructions for generating a binaural audio content in the client device 1038's memory to implement the functionality described herein.

Output components of the head-wearable apparatus 1002 include visual components, such as a display such as a liquid crystal display (LCD), a plasma display panel (PDP), a light emitting diode (LED) display, a projector, or a waveguide. The image displays of the optical assembly are driven by the image display driver 1008. The output components of the head-wearable apparatus 1002 further include acoustic components (e.g., speakers), haptic components (e.g., a vibratory motor), other signal generators, and so forth. The input components of the head-wearable apparatus 1002, the client device 1038, and server system 1032, such as the user input device 1006, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1002 may optionally include additional peripheral device elements. Such peripheral device elements may include biometric sensors, additional sensors, or display elements integrated with head-wearable apparatus 1002. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1036 from the client device 1038 via the low power wireless circuitry 1030 or high-speed wireless circuitry 1024.

Figure 11:
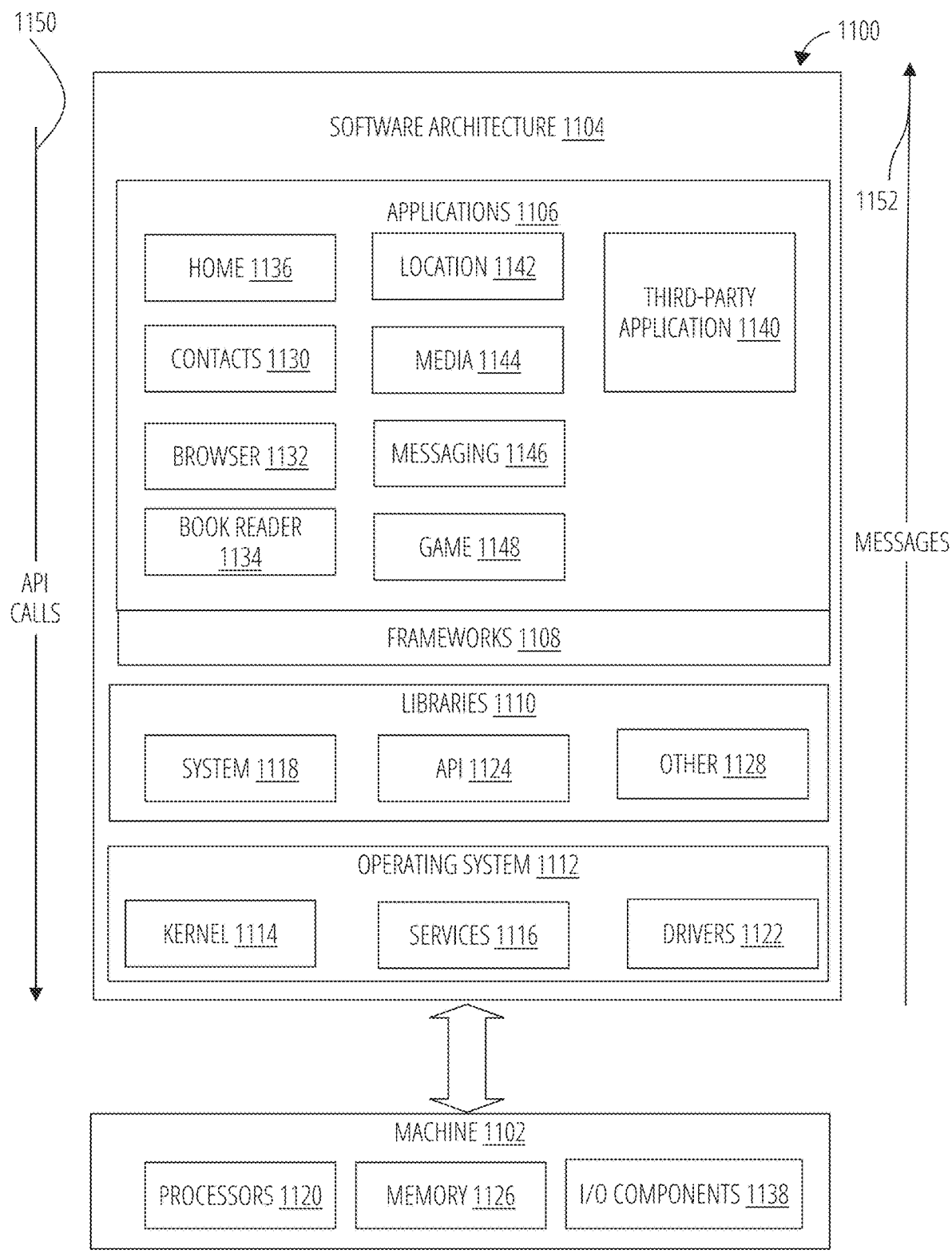
FIG. 11 is block diagram showing a software architecture within which the present disclosure may be implemented, according to an example embodiment.

FIG. 11 is a block diagram 1100 illustrating a software architecture 1104, which can be installed on any one or more of the devices described herein. The software architecture 1104 is supported by hardware such as a machine 1102 that includes Processors 1120, memory 1126, and I/O Components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, Processor management (e.g., scheduling), Component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example embodiment, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Figure 12:
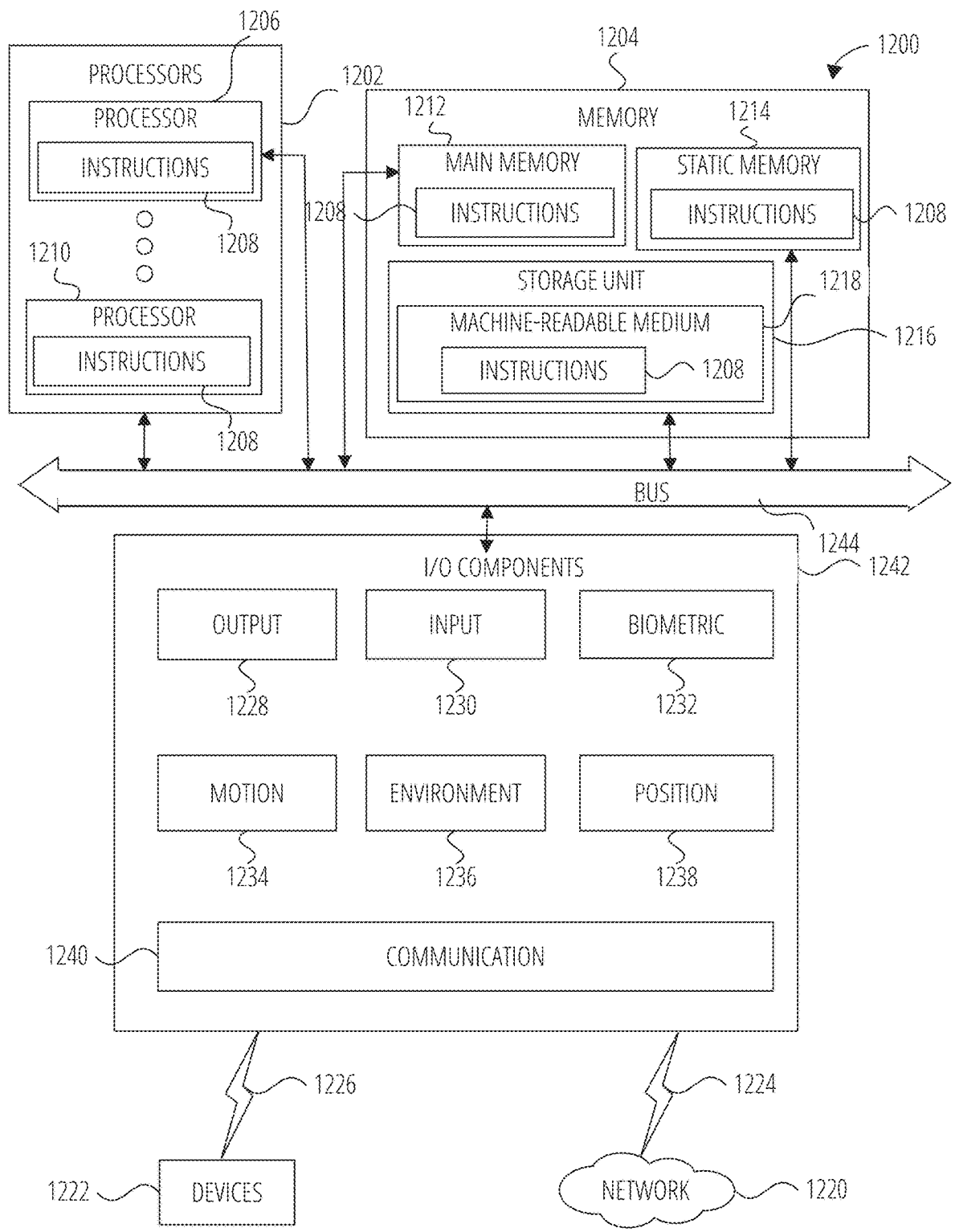
FIG. 12 is a diagrammatic representation of a machine in the form of a computer system within which a set of instructions may be executed for causing the machine to perform any one or more of the methodologies discussed herein, according to one example embodiment.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include Processors 1202, memory 1204, and I/O Components 1242, which may be configured to communicate with each other via a bus 1244. In an example embodiment, the Processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1206 and a Processor 1210 that execute the instructions 1208. The term "Processor" is intended to include multi-core Processors that may comprise two or more independent Processors (sometimes referred to as "cores") that may execute instructions contemporaneously. Although FIG. 12 shows multiple Processors 1202, the machine 1200 may include a single Processor with a single core, a single Processor with multiple cores (e.g., a multi-core Processor), multiple Processors with a single core, multiple Processors with multiples cores, or any combination thereof.

The memory 1204 includes a main memory 1212, a static memory 1214, and a storage unit 1216, both accessible to the Processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the Processors 1202 (e.g., within the Processor's cache memory), or any suitable combination thereof, during execution thereof by the machine 1200.

The I/O Components 1242 may include a wide variety of Components to receive input, provide output, produce output, transmit information, exchange information, capture measurements, and so on. The specific I/O Components 1242 that are included in a particular machine will depend on the type of machine. For example, portable machines such as mobile phones may include a touch input device or other such input mechanisms, while a headless server machine will likely not include such a touch input device. It will be appreciated that the I/O Components 1242 may include many other Components that are not shown in FIG. 12. In various example embodiments, the I/O Components 1242 may include output Components 1228 and input Components 1230. The output Components 1228 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1230 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1242 may include biometric Components 1232, motion Components 1234, environmental Components 1236, or position Components 1238, among a wide array of other Components. For example, the biometric Components 1232 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1234 include acceleration sensor Components (e.g., accelerometer), gravitation sensor Components, rotation sensor Components (e.g., gyroscope), and so forth. The environmental Components 1236 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1238 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1242 further include communication Components 1240 operable to couple the machine 1200 to a network 1220 or devices 1222 via a coupling 1224 and a coupling 1226, respectively. For example, the communication Components 1240 may include a network interface Component or another suitable device to interface with the network 1220. In further examples, the communication Components 1240 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1222 may be another machine or any of a wide variety of peripheral devices (e.g., a peripheral device coupled via a USB).

Moreover, the communication Components 1240 may detect identifiers or include Components operable to detect identifiers. For example, the communication Components 1240 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the Processors 1202) and/or storage unit 1216 may store one or more sets of instructions and data structures (e.g., software) embodying or used by any one or more of the methodologies or functions described herein. These instructions (e.g., the instructions 1208), when executed by Processors 1202, cause various operations to implement the disclosed embodiments.

The instructions 1208 may be transmitted or received over the network 1220, using a transmission medium, via a network interface device (e.g., a network interface Component included in the communication Components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a method comprising: detecting an intensity level of a full pixel from a plurality of pixels of an optical sensor, one or more full pixels of the plurality of pixels comprising at least two sub-pixels; detecting an intensity level of one or more sub-pixels; detecting that the intensity level of the full pixel of the optical sensor has reached a saturation level of the full pixel; and in response to detecting that the intensity level of the full pixel of the optical sensor has reached the saturation level of the full pixel, computing an extrapolated intensity level of the full pixel based on the intensity level of the one or more sub-pixels.

Example 2 includes the method of example 1, wherein the extrapolated intensity level of the full pixel is a product of the saturation level of the full pixel and a ratio of the one or more sub-pixels to the full pixel.

Example 3 includes the method of example 1, further comprising: retrieving the saturation level of the full pixel of the optical sensor; and identifying a sub-to-full pixel relationship between the intensity level of the one or more sub-pixels and the intensity level of the full pixel, wherein computing the extrapolated intensity level of the full pixel is further based on the saturation level of the full pixel and the sub-to-full pixel relationship.

Example 4 includes the method of example 3, wherein the sub-to-full pixel relationship includes a linear ratio relationship.

Example 5 includes the method of example 3, wherein the sub-to-full pixel relationship includes a modeled relationship.

Example 6 includes the method of example 1, wherein the optical sensor comprises a dual pixel phase-detection image sensor.

Example 7 includes the method of example 6, wherein a first sub-pixel of the at least two sub-pixels corresponds to a left sub-pixel of the dual pixel phase-detection image sensor, wherein a second sub-pixel of the at least two sub-pixels corresponds to a right sub-pixel of the dual pixel phase-detection image sensor.

Example 8 includes the method of example 6, wherein a first sub-pixel of the at least two sub-pixels corresponds to a top sub-pixel of the dual pixel phase-detection image sensor, wherein a second sub-pixel of the at least two sub-pixels corresponds to a bottom sub-pixel of the dual pixel phase-detection image sensor.

Example 9 includes the method of example 1, further comprising: generating an image based on the extrapolated intensity level of at least the full pixel from the plurality of pixels.

Example 10 includes the method of example 9, further comprising: displaying the image in a display device.

Example 11 is a computing apparatus comprising: a processor; and a memory storing instructions that, when executed by the processor, configure the apparatus to: detect an intensity level of a full pixel from a plurality of pixels of an optical sensor, one or more full pixels of the plurality of pixels comprising at least two sub-pixels; detect an intensity level of one or more sub-pixels; detect that the intensity level of the full pixel of the optical sensor has reached a saturation level of the full pixel; and in response to detecting that the intensity level of the full pixel of the optical sensor has reached the saturation level of the full pixel, compute an extrapolated intensity level of the full pixel based on the intensity level of the one or more sub-pixels.

Example 12 includes the computing apparatus of example 11, wherein the extrapolated intensity level of the full pixel is a product of the saturation level of the full pixel and a ratio of the one or more sub-pixels to the full pixel.

Example 13 includes the computing apparatus of example 11, wherein the instructions further configure the apparatus to: retrieve the saturation level of the full pixel of the optical sensor; and identify a sub-to-full pixel relationship between the intensity level of the one or more sub-pixels and the intensity level of the full pixel, wherein computing the extrapolated intensity level of the full pixel is further based the saturation level of the full pixel and the sub-to-full pixel relationship.

Example 14 includes the computing apparatus of example 13, wherein the sub-to-full pixel relationship includes a linear ratio relationship.

Example 15 includes the computing apparatus of example 13, wherein the sub-to-full pixel relationship includes a modeled relationship.

Example 16 includes the computing apparatus of example 11, wherein the optical sensor comprises a dual pixel phase-detection image sensor.

Example 17 includes the computing apparatus of example 16, wherein a first sub-pixel of the at least two sub-pixels corresponds to a left sub-pixel of the dual pixel phase-detection image sensor, wherein a second sub-pixel of the at least two sub-pixels corresponds to a right sub-pixel of the dual pixel phase-detection image sensor.

Example 18 includes the computing apparatus of example 16, wherein a first sub-pixel of the at least two sub-pixels corresponds to a top sub-pixel of the dual pixel phase-detection image sensor, wherein a second sub-pixel of the at least two sub-pixels corresponds to a bottom sub-pixel of the dual pixel phase-detection image sensor.

Example 19 includes the computing apparatus of example 11, wherein the instructions further configure the apparatus to: generate an image based on the extrapolated intensity level of at least the full pixel from the plurality of pixels.

Example 20 is a non-transitory computer-readable storage medium, the computer-readable storage medium including instructions that when executed by a computer, cause the computer to: detect an intensity level of a full pixel from a plurality of pixels of an optical sensor, one or more full pixels of the plurality of pixels comprising at least two sub-pixels; detect an intensity level of one or more sub-pixels; detect that the intensity level of the full pixel of the optical sensor has reached a saturation level of the full pixel; and in response to detecting that the intensity level of the full pixel of the optical sensor has reached the saturation level of the full pixel, compute an extrapolated intensity level of the full pixel based on the intensity level of the one or more sub-pixels.

What is claimed is:

1. A method comprising:
   detecting a saturation level of a full pixel of an optical sensor, the full pixel comprising two or more sub-pixels;
   determining a sub-to-full pixel relationship between one of the two or more sub-pixels and the full pixel; and
   computing an extrapolated intensity level of the full pixel based on the saturation level of the full pixel and the sub-to-full pixel relationship.

2. The method of claim 1, wherein the extrapolated intensity level of the full pixel is a product of the saturation level of the full pixel and the sub-to-full pixel relationship.

3. The method of claim 1, wherein determining the sub-to-full pixel relationship between one of the two or more sub-pixels and the full pixel comprises: identifying the sub-to-full pixel relationship between an intensity level of one of the two or more sub-pixels and an intensity level of the full pixel.

4. The method of claim 3, wherein the sub-to-full pixel relationship includes a linear ratio relationship.

5. The method of claim 3, wherein the sub-to-full pixel relationship includes a modeled relationship.

6. The method of claim 1, wherein the optical sensor comprises a dual pixel phase-detection image sensor.

7. The method of claim 6, wherein a first sub-pixel of the two or more sub-pixels corresponds to a left sub-pixel of the dual pixel phase-detection image sensor, wherein a second sub-pixel of the two or more sub-pixels corresponds to a right sub-pixel of the dual pixel phase-detection image sensor.

8. The method of claim 6, wherein a first sub-pixel of the two or more sub-pixels corresponds to a top sub-pixel of the dual pixel phase-detection image sensor, wherein a second sub-pixel of the two or more sub-pixels corresponds to a bottom sub-pixel of the dual pixel phase-detection image sensor.

9. The method of claim 1, further comprising:
   generating an image based, at least in part, on the extrapolated intensity level of the full pixel.

10. The method of claim 9, further comprising:
    displaying the image in a display device.

11. A computing apparatus comprising:
    one or more processors; and
    a memory storing instructions that, when executed by the one or more processors, configure the computing apparatus to perform operations comprising:
    detecting a saturation level of a full pixel of an optical sensor, the full pixel comprising two or more sub-pixels;
    determining a sub-to-full pixel relationship between one of the two or more sub-pixels and the full pixel; and
    computing an extrapolated intensity level of the full pixel based on the saturation level of the full pixel and the sub-to-full pixel relationship.

12. The computing apparatus of claim 11, wherein the extrapolated intensity level of the full pixel is a product of the saturation level of the full pixel and the sub-to-full pixel relationship.

13. The computing apparatus of claim 11, wherein determining the sub-to-full pixel relationship between one of the two or more sub-pixels and the full pixel comprises: identifying the sub-to-full pixel relationship between an intensity level of one of the two or more sub-pixels and an intensity level of the full pixel.

14. The computing apparatus of claim 13, wherein the sub-to-full pixel relationship includes a linear ratio relationship.

15. The computing apparatus of claim 13, wherein the sub-to-full pixel relationship includes a modeled relationship.

16. The computing apparatus of claim 11, wherein the optical sensor comprises a dual pixel phase-detection image sensor.

17. The computing apparatus of claim 16, wherein a first sub-pixel of the two or more sub-pixels corresponds to a left sub-pixel of the dual pixel phase-detection image sensor, wherein a second sub-pixel of the two or more sub-pixels corresponds to a right sub-pixel of the dual pixel phase-detection image sensor.

18. The computing apparatus of claim 16, wherein a first sub-pixel of the two or more sub-pixels corresponds to a top sub-pixel of the dual pixel phase-detection image sensor, wherein a second sub-pixel of the two or more sub-pixels corresponds to a bottom sub-pixel of the dual pixel phase-detection image sensor.

19. The computing apparatus of claim 11, further comprising:
    generating an image based, at least in part, on the extrapolated intensity level of the full pixel; and
    displaying the image in a display device.

20. A non-transitory computer-readable storage medium, the non-transitory computer-readable storage medium including instructions that when executed by a computer, cause the computer to:
    detecting a saturation level of a full pixel of an optical sensor, the full pixel comprising two or more sub-pixels;
    determining a sub-to-full pixel relationship between one of the two or more sub-pixels and the full pixel; and
    computing an extrapolated intensity level of the full pixel based on the saturation level of the full pixel and the sub-to-full pixel relationship.

* * * * *